May 17, 1955     J. A. SPRUNG ET AL     2,708,625
PHOTOGRAPHIC ELEMENT FOR THE PRODUCTION OF SUBTRACTIVE
COLOR IMAGES BY SULFONHYDRAZIDE COLOR DEVELOPMENT
Filed Jan. 19, 1951

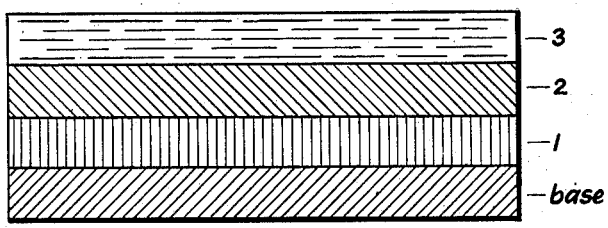

*1* = red sensitive silver halide emulsion containing as a cyan color former a phenolic compound capable of coupling with a primary aromatic amino developer but incapable of coupling with a sulfonhydrazide developer.

*2* = green sensitive silver halide emulsion containing as an azo dye coupling component for magenta a colorless naphtol capable of coupling with a sulfonhydrazide developer.

*3* = blue sensitive silver halide emulsion containing as an azo dye coupling component for yellow a compound capable of coupling with a sulfonhydrazide developer such as a pyrazolone, an open chain ketomethylene compound or a monocyclic phenol.

INVENTORS
JOSEPH A. SPRUNG
WILLY A. SCHMIDT
BY
ATTORNEYS

United States Patent Office 2,708,625
Patented May 17, 1955

2,708,625

PHOTOGRAPHIC ELEMENT FOR THE PRODUCTION OF SUBTRACTIVE COLOR IMAGES BY SULFONHYDRAZIDE COLOR DEVELOPMENT

Joseph A. Sprung and Willy A. Schmidt, Easton, Pa., assignors to General Aniline & Film Corporation, New York, N. Y., a corporation of Delaware Application January 19, 1951, Serial No. 206,938

3 Claims. (Cl. 95—2)

The present invention relates to the production of subtractively colored photographic material, and more particularly to the production of such material by utilizing the sulfonhydrazide color development to form yellow and magenta azo dye images, and a further additional step to produce the cyan image.

United States Letters Patent 2,424,256, granted July 22, 1947, to applicants, describes the production of azo dye images in photographic silver halide emulsion layers by color developing the exposed emulsion layers with a sulfonhydrazide color developer in the presence of a color former.

The patent points out that by selecting the appropriate color developer and color former combinations, it is possible to produce yellow, magenta and cyan azo dye images in monolayer material. However, experience has shown that it is difficult to find 3 color formers which would simultaneously combine with one and the same sulfonhydrazide color developer, to produce the 3 subtractive color images.

In the silver azo dye bleach-out process which is adapted for the manufacture of color prints, the problem of selecting the dyes is relatively simple for the reason that azo dyes of acceptable photographic characteristics are incorporated as such in the sensitized layers, and after exposure and black and white development the dyes are bleached in situ with the silver image. However, no one to date has synthesized a cyan azo dye color former for use in the silver azo dye bleach-out "taking film" process in which the azo dyes must be formed indiscriminately from one and the same diazonium salt and then bleached selectively after development of the sensitized material to silver images. In the latter case, the problem was only solved by using yellow and magenta azo dye color formers in combination with a heterocyclic color component which is capable of being selectively bleached at a silver image, and which is capable of forming a blue-green complex ferrous iron dye image. In the latter connection, reference is made to USP 2,635,960, issued April 21, 1953, to Joseph A. Sprung, and entitled "High Speed Silver Dye Bleach-Out Taking and Printing Film."

It has been observed that the sulfonhydrazide color developer is particularly useful for producing yellow and magenta azo dye images which possess excellent fastness to light and chemicals, and whose spectral characteristics are highly desirable from the photographic color standpoint.

We have now found that capital can be made of this observation by the construction of a 2-step process in which the sulfonhydrazide color developer is employed for producing the yellow and magenta azo dye images, and a separate step is resorted to for the formation of the cyan dye image. We have also constructed photographic material which is amenable to such processing, and such material and the processing thereof, as previously indicated, constitute the purposes and objects of our invention.

The light sensitive photographic color material which is designed for use with our method may be constructed in several fashions. Preferably, however, our material is constructed as follows.

A red sensitive silver halide emulsion containing a color former fast to diffusion and capable of yielding a quinoneimine cyan dye image is cast on a base. Over the red sensitive emulsion there is cast a green sentitive emulsion containing a color former fast to diffusion and capable of yielding a magenta azo dye image with a sulfonhydrazide developer. Over the green sensitive emulsion there is cast a colloidal silver layer, and over this layer a blue sensitive emulsion containing a color former fast to diffusion and capable of yielding a yellow azo dye image upon development with a sulfonhydrazide developer.

The color formers which are utilized for the formation of the yellow azo dye image are pyrazolones preferably, having a phenyl substituent in the 1 position, open chain ketomethylene compounds and phenols, said compounds containing a group rendering them fast to diffusion in a photographic silver halide emulsion. This end is best accomplished by employing as a substituent therein, an aliphatic carbon chain having at least 10 carbon atoms.

Pyrazolones which are suitable for our purpose are described in United States Letters Patent 2,186,849, granted January 9, 1940, to Wilmanns et al., and 2,292,575, granted August 11, 1942 to Hans Loleit et al. Examples of such pyrazolones are, for example:

1 - (5' - sulfo - 3' - stearylaminophenyl) - 3 - methyl-5 - pyrazolone,
1 - (4' - stearylaminophenyl) - 3 - methyl - 5 - pyrazolone,
1 - (3' - stearylaminophenyl) - 5 - pyrazolone - 3 - carboxylic acid of the formula:

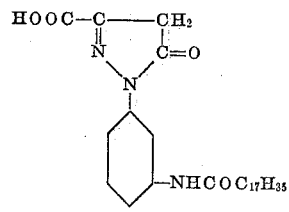

and the like.

Examples of suitable open chain ketomethylene compounds are:

3'-stearylaminobenzoylacetanilide-4-carboxylic acid,
3'-myristylaminobenzoylacetanilide-4-carboxylic acid,
3 - acetoacetylamino - 6 - N - methyl - N - octadecylamino-benzenesulfonic acid, and the like.

Examples of suitable phenols are:

2 - hydroxy - 4 - (3' - stearylaminophenylsulfoniamido)-benzenesulfonic acid,
2 - hydroxy - 4 - (3' - myristylaminophenylsulfonamido)-benzenesulfonic acid, and the like.

Color formers suitable for production of the magenta azo dye image are naphthols having a free position ortho or para to the coupling directing phenolic hydroxyl group and having a group rendering the naphthol fast to diffusion in photographic silver halide emulsions. As previously noted, this substituent generaly takes the form of a long aliphatic chain.

Naphthols suitable for our purpose are described in United States Letters Patent 2,324,832, granted July 20, 1943, to Frohlich et al. Examples of such naphthols are:

1 - hydroxy - 2 - naphthoylamino - 4' - methyloctadecyl-aminobenzene-3'-sulfonic acid,
1 - hydroxy - 2 - naphtholyamino - 2' - methyloctadecyl-aminobenzene-5-sulfonic acid,
8 - (3' - stearylaminobenzoylamino) - 1 - naphthol - 3,6-disulfonic acid, and the like.

The color former for producing the cyan dye image is a compound containing a phenolic hydroxyl group and bearing a substituent rendering it fast to diffusion in photographic silver halide emulsions and in para position to the phenolic hydroxyl group, a replaceable substituent such as bromine or a sulfonic acid group. Such color formers may be phenols, naphthols or 8-hydroxyquinolines.

It has been observed, and this is an important feature of our invention, that such color formers are not affected by sulfonhydrazide color development due to the fact that the coupling position is blocked by the bromine or sulfonic acid group. Such group on the other hand is displaced by the conventional developers for producing quinoneimine dye images such as developers of the p-phenylenediamine type. This fact is represented by the following equations, the first of which discloses the development with p-diethylaminoaniline and the second with a sulfonhydrazide.

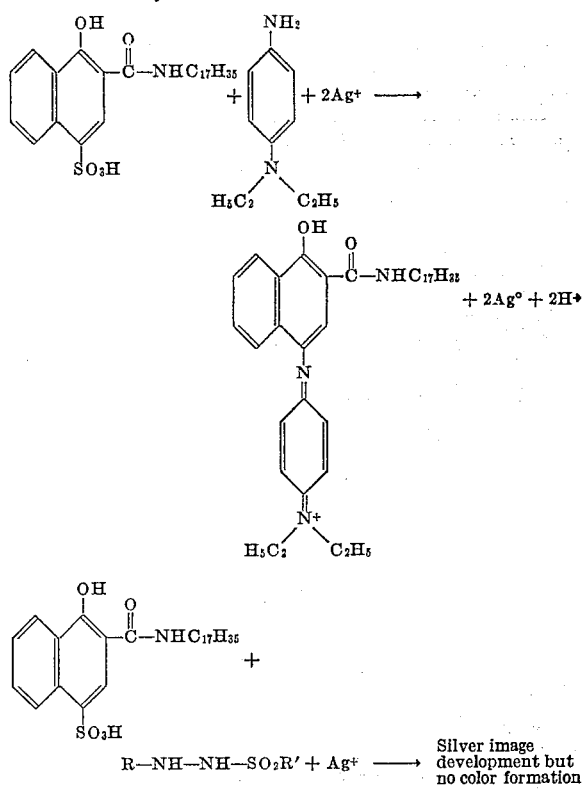

R = a phenyl radical such as methoxyphenyl.
R' = an alkyl radical such as methyl or aryl such as phenyl.

Color formers capable of yielding the cyan dye images upon color development with a developer of the p-phenylenediamine type are, for instance, the phenols and naphthols described in United States Letters Patent 2,343,051, granted February 29, 1944, to Alfred Frohlich. Examples of such color formers are.

1,2,3-xylenolcarboyloctadecylamino-4-sulfonic acid,
2 - (3' - octadecylamino - 4' - sulfophenylcarbamyl) - 1-naphthol-4-sulfonic acid,
2 - (3' - octadecylamino - 4' - carboxyphenylcarbamyl) - 1-naphthol-4-sulfonic acid,
2 - (stearylcarbamyl) - 1 - naphthol - 4 - sulfonic acid, and the like.

A multilayer film of the above construction may be processed to give reversed dye images according to the following schemes:

SCHEME 1

The tripack is exposed and developed to primary silver images in a black and white developer. The residual silver halide is then re-exposed to white light and the blue and green sensitive layers are color developed to yield yellow and magenta azo dye images by means of a sulfonhydrazide developer. The red sensitive layer is then developed with a p-phenylenediamine developer to yield a cyan quinoneimine dye image in the red sensitive layer.

SCHEME 2

The tripack is exposed and developed to primary silver images in a black and white developer. The red sensitive layer is then re-exposed to red light from the back and is color developed with a p-phenylenediamine type developer. The residual silver halide of the blue and green sensitive layers is then re-exposed to white light and these two layers are developed with a sulfonhydrazide developer.

Either of these procedures, as is evident, will produce the subtractive colored images in the 3 layers.

It is, of course, apparent to operators skilled in this art that certain precautions are necessary in order to obtain, with the above procedures, a well-balanced set of subtractive colored images. These precautions, moreover, may be exercised either with respect to the tripack or with respect to the chemicals utilized in the processing of the tripack.

For example, in Scheme 1 above, it is not of too much importance if the sulfonhydrazide developer penetrates to the bottom red sensitive layer because it cannot develope color with the quinoneimine color former located therein. However, care must be taken that it does not totally develop the reversed silver halide image in the bottom layer or sufficient silver halide will not be available to give the cyan quinoneime dye image of the necessary density and contrast during the second development.

It is, therefore, important to restrict the penetration of the sulfonhydrazide developer to the bottom layer and this end can be accomplished either (1) by adding gelatin antiswelling reagents such as sodium sulfate to the sulfonhydrazide developer, and/or (2) by locating a relatively thick gelatin layer between the green and red sensitive silver halide emulsion layers.

Furthermore, after the sulfonhydrazide development, it is essential that no residual silver halide remain in the blue and green sensitive layers. In this connection, it is to be pointed out that the color formers located in these layers will couple with the oxidation products of a p-phenylenediamine developer to yield magenta images (with the pyrazolones) and cyan images (with the phenols or naphthols). Consequently, if any silver halide remains after the color development step in the blue and green sensitive layers, color degradation will necessarily ensue.

Various means are available for remedying this situation. One of these involves the addition of mild silver halide solvents such as ethylenediamine to the sulfonhydrazide developer compositions to insure complete removal of all the residual silver halide in the blue and green sensitive layers.

Alternately, we may resort to controlled bathing of the tripack prior to quinoneimine color development in a solution of insoluble silver salt forming substances such as potassium iodide or the 2-thiobarbituric acid derivatives or thioureido naphthols described in U. S. Patent 2,636,-821, issued April 28, 1953, to Donald E. Sargent. This controlled bathing will block or render undevelopable the residual silver halide in the two top layers of the tripack.

It has been indicated above that it is preferred to construct the tripack with the color formers located in a non-diffusing state in the various sensitized layers. It is obvious, however, that the color formers may be incorporated in the developing solutions and the tripack processed according to the selective second exposure and color development method as described, for instance, in United States Letters Patent 2,320,418 granted June 1, 1943, to Eggert et al. and in 2,191,502 granted Feb. 27, 1940 to Sease et al.

It is apparent that in this processing, the same developers and color formers would be used, excepting that the color formers would not contain the group rendering them fast to diffusion in the emulsions. In the latter case, it would not be important to select a cyan quinoneimine color former with a blocking substituent in the para position to the activating group because the excess color former would necessarily be removed by diffusion during the washing process following the quinoneimine color forming step, and would not be present either during a preliminary or subsequent sulfonhydrazide development.

It will be evident to a skilled operator that one may use conjointly diffusing and non-diffusing color formers to effect color formation in the same film. For example, one may use non-diffusing yellow and magenta color formers (developable by a sulfonhydrazide developer) and a diffusing cyan color former (developable with a diffusing p-phenylenediamine developer).

It has been indicated above that the usual arrangement of the sensitive layers in the tripack is to be preferred. However, it is possible by reversing the order of the coatings, to process the film from the standpoint of the production of the cyan image by means other than described. In reversing the order of the coatings, the blue sensitive layer would be coated on the base, the green sensitive on the blue sensitive layer, and the red sensitive layer would be outermost.

In this case, the red sensitive emulsion, being on the top layer of the tripack, lends itself to the formation therein, of a surface cyan dye image by any of the following methods:

1. Imagewise mordanting of the silver halide according to English Patent 466,710, and subsequent dyeing of the mordant image with cyan basic dyestuffs, such as Methylene Blue or Rhoduline Blue 6GA.

2. Conversion of the silver image to cyan Prussian Blue image according to United States Letters Patent 2,320,108 and 2,320,109.

3. Conversion of the silver image to a silver ferricyanide image, according to United States Letters Patent 1,279,248, and the subsequent use of the latter to oxidize in an imagewise manner the sulfuric acid esters of the leuco forms of the cyan vat dyes.

4. Conversion of the silver halide image to a metallic complex salt image by bathing the film in a solution of a cyan ferrous complex salt of 5-nitroso-2-thiobarbituric acid, as described, for example, in United States Letters Patent 2,533,181, and 2,533,182, granted December 5, 1950, to Donald E. Sargent.

The sulfonhydrazide developers which are to be employed are those described in United States Letters Patent 2,424,256, granted to Willy A. Schmidt and Joseph A. Sprung on July 22, 1947.

Examples of such sulfonhydrazide developers are:

β-(2-ethoxyphenyl)-methanesulfonhydrazide,
β-(3'-methoxyphenyl)-methanesulfonhydrazide,
β-phenyl-3-carboxybenzenesulfonhydrazide,
β-(3'-acetamidophenyl)-methanesulfonhydrazide, and the like.

The developers for production of the quinoneimine dye images are the conventional p-phenylenediamine developers such as p-phenylenediamine itself, p-diethylaminoaniline, p-dimethylaminoaniline, and the like.

The invention is illustrated by the accompanying self-explanatory drawing and the following examples but it is to be understood that the invention is not restricted thereto. The parts are by weight unless otherwise stated.

PREPARATION OF TRIPACK

Example 1

Onto a transparent base there is cast a red sensitive silver bromide emulsion containing per kilo of emulsion, 20 g. of 2-(stearylcarbamyl)-1-naphthol-4-sulfonic acid [prepared according to Fiat Final Report #943, page 68]. Over the red sensitive layer there is cast a gelatin separation layer, and over the gelatin separation layer a green sensitive silver bromide emulsion containing per kilo, 20 g. of 8-(3'-stearylaminobenzoyl) - 1 - naphthol-3,6-disulfonic acid. Over the green sensitive layer there is cast a yellow colloidal silver filter layer, and over this layer there is cast a blue sensitive silver bromide emulsion containing per kilo, 20 g. of 1-(3'-stearylaminophenyl)-5-pyrazolone-3-carboxylic acid.

Example 2

The procedure is the same as in Example 1, excepting that the azo color former in the green sensitive layer is replaced by the compound 1-hydroxy-2-naphthoylamino-2'-methyloctadecylaminobenzene-5-sulfonic acid. [Prepared according to Fiat Final Report #943, page 68.]

PREPARATION OF COLOR FORMING COMPONENTS

Example 3.—β-(2-ethoxyphenyl)-methanesulfonhydrazide

A mixture of 37 g. (0.2 mol) of 2-ethoxyphenylhydrazine hydrochloride, 22.9 g. (0.2 mol) methanesulfonylchloride and 33.6 g. (0.4 mol) sodium bicarbonate in 400 cc. of ethyl ether, was stirred for one hour at room temperature and finally refluxed for two hours on a steam bath. The cooled mixture was treated with 400 cc. of low-boiling petroleum ether, and the precipitated material was removed by filtration and washed with petroleum ether. The solid was digested twice at room temperature with dilute hydrochloric acid (5 cc. hydrochloric acid in 250 cc. water), and was finally washed with water and air dried. Yield—40 g. (87%), M. P.—105° C.

Example 4.—1-(3'-stearylaminophenyl)-5-pyrazolone-3-carboxylic acid

A well-agitated warm (steam bath) solution of 53.7 parts of 1-(3-aminophenyl)-5-pyrazolone-3-carboxylic acid in 114 parts of pyridine and 336 parts of dimethylformamide was treated with 89 parts of freshly prepared stearoylchloride over a period of 1½ hours. The solution was heated on a steam bath until the diazotization test for free amino group was negative. The reaction mixture was poured inot a solution of 128 parts of concentrated HCl in 2000 parts of water, and the precipitate was removed by filtration and washed with water. After the compound had been dried in an oven at 50° C., it was extracted in a Soxhlet apparatus with high boiling petroleum ether to remove the stearic acid. The extracted solid was dissolved in a minimum amount of boiling pyridine, decolorized with "Norite," and was treated with hot glacial acetic acid (approximately three times the volume of pyridine) to incipient cloudiness. The precipitated color former, which was removed by filtration from the cooled (50° C.) solution, was washed with cold 95% ethanol and air dried. The yield was 75.5 parts.

Example 5.—8-(3'-stearylaminobenzoylamino)-1-naphthol-3,6-disulfonic acid

To a solution of 92 parts of finely powdered 8-(3'-aminobenzamido)-1-naphthol-3,6-disulfonic acid in 400 parts of dimethylformamide and 100 parts of pyridine there was slowly added 61 parts of freshly prepared stearoyl chloride. The mixture was heated on a steam bath for 30 minutes and then additional stearoyl chloride was added until a diazotization test showed the amino group to be completely acylated. The reaction mixture was poured into 2000 parts of 15% sodium chloride solution and 100 parts of concentrated HCl. After a period of 15 minutes, the precipitate was removed by filtration, digested with 2000 parts of 15% sodium chloride solution and was again removed by filtration. The filter cake was dried in vacuo at 50° C. The dried finely powdered solid was extracted once with boiling acetone and twice with low boiling petroleum ether. Sodium chloride was eliminated by an extraction of the production with dimethylformamide. The solvent was removed by vacuum distillation and the residue, which was digested with acetone, weighed 109.5 parts.

PROCESSING OF MULTILAYER FILM

*Example 6*

The tripack of Example 1 is exposed and then processed as follows:

Step 1. Primary silver image develompment 12 minutes at 20° C.

| | |
|---|---|
| Water _____cc__ | 750.0 |
| Metol _____g__ | 3.0 |
| Sodium sulfite (anhydrous)_____g__ | 50.0 |
| Sodium carbonate (monohydrate)_____g__ | 40.0 |
| Sodium thiocyanate_____g__ | 2.0 |
| Potassium bromide_____g__ | 2.0 |
| Water to make 1000.0 cc. | |

Step 2. Short stop for 3 minutes.

| | |
|---|---|
| Sodium bisulfite_____g__ | 50.0 |
| Water to make 1000.0 cc. | |

Step 3. Wash for 5 minutes.
Step 4. Overall white light expsoure.
Step 5. Azo dye color development 5 to 10 minutes at 20° C.

| | |
|---|---|
| β-(2-ethoxyphenyl) - methanesulfonhydrazide in 15.0 cc. dioxane_____g__ | 3.0 |
| Potassium bromide_____g__ | 2.0 |
| Sodium sulfite (anhydrous)_____g__ | 10.0 |
| Sodium carbonate (monohydrate)_____g__ | 25.0 |
| Ethylenediamine _____cc__ | 20.0 |
| Hydroxylamine hydrochloride_____g__ | 2.0 |
| Water to make 1000.0 cc. | |

Step 6. Short stop for 3 minutes.

| | |
|---|---|
| Sodium bisulfite_____g__ | 50.0 |
| Water to make 1000.0 cc. | |

Step 7. Wash for 10 minutes.
Step 8. Quinone-imine color development 18 minutes

| | |
|---|---|
| Water _____cc__ | 750.0 |
| Sodium bisulfite_____g__ | 1.0 |
| p-Diethylaminoaniline hydrochloride_____g__ | 3.0 |
| Sodium carbonate (anhydrous)_____g__ | 67.5 |
| Potassium bromide_____g__ | 2.5 |
| Water to make 1000.0 cc. | |

Step 9. Short stop for 2 minutes.

| | |
|---|---|
| Sodium bisulfite_____g__ | 50.0 |
| Water to make 1000.0 cc. | |

Step 10. Harden for 4 minutes at 20° C.

| | |
|---|---|
| Water _____cc__ | 1000.0 |
| Potassium chrome alum_____g__ | 30.0 |

Step 11. Wash for 10 minutes.
Step 12. Bleach for 5 minutes at 20° C.

| | |
|---|---|
| Water _____cc__ | 750.0 |
| Potassium ferricyanide_____g__ | 60.0 |
| Potassium bromide_____g__ | 15.0 |
| Dibasic sodium phosphate_____g__ | 13.0 |
| Sodium bisulfate_____g__ | 6.0 |
| Water to make 1000.0 cc. | |

Step 13. Wash for 3 minutes.
Step 14. Fix for 5 minutes at 20° C.

| | |
|---|---|
| Water _____cc__ | 1000.0 |
| Sodium thiosulfate_____g__ | 200.0 |

Step 15. Wash.

There is thus obtained, subtractively colored, brilliant reversed dye images.

*Example 7*

The film of Example 2 is exposed and then processed as follows:

Step 1. Primary silver image development 12 minutes at 20° C.

| | |
|---|---|
| Water _____cc__ | 750.0 |
| Metol _____g__ | 3.0 |
| Sodium sulfite (anhydrous)_____g__ | 50.0 |
| Sodium carbonate (monohydrate)_____g__ | 40.0 |
| Sodium thiocyanate_____g__ | 2.0 |
| Potassium bromide_____g__ | 2.0 |
| Water to make 1000.0 cc. | |

Step 2. Short stop for 3 minutes.

| | |
|---|---|
| Sodium bisulfite_____g__ | 50.0 |
| Water to make 1000.0 cc. | |

Step 3. Wash for 5 minutes.
Step 4. Selective re-exposure to red light through film back.
Step 5. Quinone-imine color development 15 minutes at 20° C.

| | |
|---|---|
| Water _____cc__ | 750.0 |
| p-Diethylaminoaniline hydrochloride_____g__ | 2.75 |
| Hydroxylamine hydrochloride_____g__ | 1.2 |
| Sodium sulfite (anhydrous)_____g__ | 2.0 |
| Sodium carbonate (monohydrate)_____g__ | 66.0 |
| Potassium bromide_____g__ | 2.5 |
| Water to make 1000.0 cc. | |

Step 6. Short stop for 1 minute.

| | |
|---|---|
| Sodium bisulfite_____g__ | 50.0 |
| Water to make 1000.0 cc. | |

Step 7. Harden for 4 minutes.

| | |
|---|---|
| Water _____cc__ | 1000.0 |
| Potassium chrome alum_____g__ | 30.0 |

Step 8. Wash for 10 minutes.
Step 9. Re-exposure to white light.
Step 10. Azo dye color development 5 to 10 minutes at 20° C.

| | |
|---|---|
| β-(2-ethoxyphenyl)methane sulfonhydrazide in 15.0 cc. dioxane_____g__ | 3.0 |
| Potassium bromide_____g__ | 2.0 |
| Sodium sulfite (anhydrous)_____g__ | 10.0 |
| Sodium carbonate (monohydrate)_____g__ | 25.0 |
| Ethylenediamine _____g__ | 20.0 |
| Hydroxylamine hydrochloride_____g__ | 2.0 |
| Water to make 1000.0 cc. | |

Step 11. Short stop for 3 minutes.
Step 12. Wash for 10 minutes.
Step 13. Bleach for 5 minutes.

| | |
|---|---|
| Water _____cc__ | 750.0 |
| Potassium ferricyanide_____g__ | 60.0 |
| Potassium bromide_____g__ | 15.0 |
| Dibasic sodium phosphate_____g__ | 13.0 |
| Sodium bisulfate_____g__ | 6.0 |
| Water to make 1000.0 cc. | |

Step 14. Wash for 3 minutes.
Step 15. Fix for 5 minutes.

| | |
|---|---|
| Water _____cc__ | 1000.0 |
| Sodium thiosulfate_____g__ | 200.0 |

Step 16. Wash.

The result is substantially the same as that of Example 1.

Various modifications of the invention will occur to persons skilled in the art. Thus, as is evident, we may use other color formers of the type previously mentioned in lieu of those of the examples. Similarly, any of the sulfonhydrazides contemplated by United States Letters Patent 2,424,256 may be employed. We, therefore, do not intend to be limited in the art granted, except as necessitated by the appended claims.

We claim:

1. A photographic color tripack comprising a base, a red sensitive silver halide emulsion on the base containing as a cyan color former, a colorless compound containing a phenolic hydroxyl group and having a group rendering the color former non-migratory in the emulsion and being substituted para to the phenolic hydroxyl group by a substituent replaceable on development with a primary aromatic amino developer to form a cyan quinoneimine dye image but not replaceable on development with a sulfonhydrazide developer, a green sensitive silver halide emulsion on the red sensitive emulsion containing as an azo dye coupling component capable of forming a magenta azo dye with a sulfonhydrazide developer, a colorless naphthol bearing a group rendering it non-migratory in the emulsion and having a free coupling position selected from the class ortho and para to the phenolic hydroxyl group of the naphthol, and a blue sensitive silver halide emulsion on the green sensitive emulsion containing as an azo dye coupling component, a colorless compound having a group rendering it non-migratory in the emulsion, said compound being capable of forming a yellow azo dye with a sulfonhydrazide developer and being selected from the class consisting of pyrazolones, open chain ketomethylene compounds and monocyclic phenols.

2. The tripack as defined in claim 1 in which the blue and green sensitive emulsions are separated by a yellow filter layer and in which the green and red sensitive emulsions are separated by a relatively thick gelatin separation layer operating to prevent access to said red sensitive layer of the developer used with the other layers.

3. The tripack as defined in claim 1 wherein the yellow azo color former is 1-(3'-stearylaminophenyl)-5-pyrazolone-3-carboxylic acid, the azo magenta color former is 8 - (3'-stearylaminobenzoylamino) - 1 - naphthol - 3,6-disulfonic acid, and the cyan color former is 2-(stearylcarbamyl)-1-naphthol-4-sulfonic acid.

References Cited in the file of this patent

UNITED STATES PATENTS

| | | |
|---|---|---|
| 2,148,979 | Dieterle | Feb. 28, 1939 |
| 2,295,013 | Schinzel | Sept. 8, 1942 |
| 2,306,410 | Schinzel | Dec. 29, 1942 |
| 2,367,551 | Yule | Jan. 16, 1945 |
| 2,393,027 | Duerr et al | Jan. 15, 1946 |